United States Patent
Ring

(10) Patent No.: US 7,416,262 B2
(45) Date of Patent: Aug. 26, 2008

(54) BRAKE SYSTEM WITH INTEGRATED CAR LOAD COMPENSATING ARRANGEMENT

(75) Inventor: Michael E. Ring, St. John, IN (US)

(73) Assignee: Wabtec Holding Corp., Wilmerding, PA (US)

( * ) Notice: Subject to any disclaimer, the term of this patent is extended or adjusted under 35 U.S.C. 154(b) by 154 days.

(21) Appl. No.: 11/145,738

(22) Filed: Jun. 6, 2005

(65) Prior Publication Data

US 2005/0275279 A1    Dec. 15, 2005

Related U.S. Application Data

(60) Provisional application No. 60/578,450, filed on Jun. 9, 2004.

(51) Int. Cl.
*B60T 8/18* (2006.01)
*F16D 49/16* (2006.01)

(52) U.S. Cl. ............ 303/22.2; 303/22.5; 303/22.7; 188/153 R; 188/151 R

(58) Field of Classification Search ............ 303/22.2, 303/22.5, 22.7; 188/153 R, 151 R; 137/118.06
See application file for complete search history.

(56) References Cited

U.S. PATENT DOCUMENTS

| | | | |
|---|---|---|---|
| 2,844,161 A * | 7/1958 | Ostwald | 137/118.06 |
| 3,178,238 A | 4/1965 | Walter | |
| 3,376,080 A * | 4/1968 | Kettering et al. | 303/22.6 |
| 3,608,680 A | 9/1971 | Beacon | |
| 4,613,016 A | 9/1986 | Hart et al. | |
| 4,793,446 A | 12/1988 | Hart et al. | |
| 5,052,761 A * | 10/1991 | Thony | 303/22.6 |
| 5,269,594 A | 12/1993 | Barefoot et al. | |
| 5,350,225 A * | 9/1994 | Steiner et al. | 303/113.4 |
| 5,551,766 A | 9/1996 | Bruswood et al. | |
| 5,575,221 A * | 11/1996 | Biegel et al. | 105/226 |
| 5,735,580 A | 4/1998 | Klink et al. | |
| 6,116,385 A * | 9/2000 | Ring | 188/153 D |
| 6,269,916 B1 | 8/2001 | Daugherty | |

* cited by examiner

*Primary Examiner*—Bradley King
*Assistant Examiner*—Mahbubur Rashid
(74) *Attorney, Agent, or Firm*—James Ray & Assoc.

(57) ABSTRACT

A railway car brake system comprising a control device engageable with a predetermined portion of such railway car for compensating braking force in response to a load carried by such railway car. The control device includes a sensor mechanism engageable with a truck bolster or a movable car structure for sensing a vertical position thereof corresponding to a load carried by the railway car. There is a control valve engageable with the sensor mechanism which generates a fluid pressure signal responsive to such load. A pneumatic actuator engageable with a predetermined brake beam disposed on such truck assembly and connected to such control valve. This pneumatic actuator generates a predetermined braking force responsive to the fluid pressure signal and further responsive to the load carried by the railway car as sensed by the sensor mechanism. Such predetermined braking force may be proportionally adjusted to variations in the load carried by the railway car.

11 Claims, 3 Drawing Sheets

BRAKE SYSTEM WITH INTEGRATED CAR LOAD COMPENSATING ARRANGEMENT

CROSS-REFERENCE TO RELATED APPLICATIONS

This application is related to and claims priority from U.S. Provisional Patent Application Ser. No. 60/578,450 filed on Jun. 9, 2004.

FIELD OF THE INVENTION

The present invention relates, in general, to brake systems for railway cars and, more particularly, this invention relates to a railway car brake system having an integrated car load compensating arrangement.

BACKGROUND OF THE INVENTION

Brake systems for railway car double axle wheel trucks generally include brake shoes mounted on opposite ends of a pair of brake beams which are positioned between the axles. These brake beams are movable away from each other in order to bring such brake shoes into engagement with the wheel treads.

Customarily, these prior art type brake systems include a cylinder and piston for actuating the brake shoes into frictional engagement with the wheels. The cylinder and piston can either be mounted on the railroad car which the wheel truck supports, "car mounted", or can be mounted on the wheel truck, "truck mounted." In both cases, a multiple lever system interconnects the piston and the brake beams for proper operation of the brakes.

As is well known in the railway industry, one of the major problems arising in all railway car brake systems is that the load imposed by the cars on their respective wheel trucks can vary considerably from car to car and truck to truck. Thus, in a single train consist, some of the cars may be fully loaded, some partially loaded, and some empty. Conditions may exist where one end of a car is loaded differently than the other end which poses different requirements for braking systems mounted at each truck.

Consequently, if uniform pressure is applied to the pneumatic means, i.e., the piston/cylinder, for the wheels of all the cars, the braking effect will be much higher on partially loaded and empty cars than on fully loaded cars. Obviously, as would be expected, this situation is undesirable.

SUMMARY OF THE INVENTION

The present invention provides a railway vehicle brake system equipped with a control device engageable with a predetermined portion of such railway car for compensating braking force in response to a load carried by such railway car. The control device includes a sensor mechanism engageable with a truck bolster or a movable car structure for sensing a vertical position thereof corresponding to a load carried by the railway car. There is a control valve engageable with the sensor mechanism which generates a fluid pressure signal responsive to such load. A pneumatic actuator engageable with a predetermined brake beam disposed on such truck assembly and connected to such control valve. This pneumatic actuator generates a predetermined braking force responsive to the fluid pressure signal and further responsive to the load carried by the railway car as sensed by the sensor mechanism. In a first embodiment, the fluid pressure signal is responsive to a railway car carrying an empty load and a load greater than such empty load. The control valve being a directional flow control valve, generates a first fluid pressure signal corresponding to such empty load and a combination of such first fluid pressure signal and a second fluid pressure signal corresponding to a load greater than the empty load. Accordingly, the pneumatic actuator is adapted with a first actuating means receiving such first fluid pressure signal for generating a braking force corresponding to the railway car carrying an empty load and a second actuating means receiving such second fluid pressure signal substantially simultaneous to such first actuating means receiving such first fluid pressure signal and resulting in generation of a braking force corresponding to the load being greater than the empty load. In a second embodiment, the control valve is a metering flow control valve and generates a pressure fluid signal incrementally proportional to the load carried by such railway car. Accordingly, the pneumatic actuator receives a proportionally adjusted fluid pressure and generates corresponding proportionally adjusted braking force. Such predetermined braking force may be proportionally adjusted to variations in the load carried by the railway car.

OBJECTS OF THE INVENTION

It is, therefore, one of the primary objects of the present invention to provide a brake system for wheel trucks of the railway car which automatically compensates for different loads carried by the railway car and imposed on the trucks.

Another object of the present invention is to provide a brake system for wheel trucks of the railway car which insures uniform braking forces for different car loads.

Still another object of the present invention is to provide a simple, light weight truck mounted brake system for wheel trucks which uses standard truck components and brake beams, provides high braking efficiency, and includes automatic slack adjustment for brake shoe wear in addition to compensating for car loading.

Although a number of objects and advantages of the present invention have been described in some detail above, various additional objects and advantages of the brake cylinder of the present invention will become more readily apparent to those persons who are skilled in the art from the following more detailed description of the invention, particularly, when such detailed description is taken in conjunction with both the attached drawing figures and with the appended claims.

Figure 1:
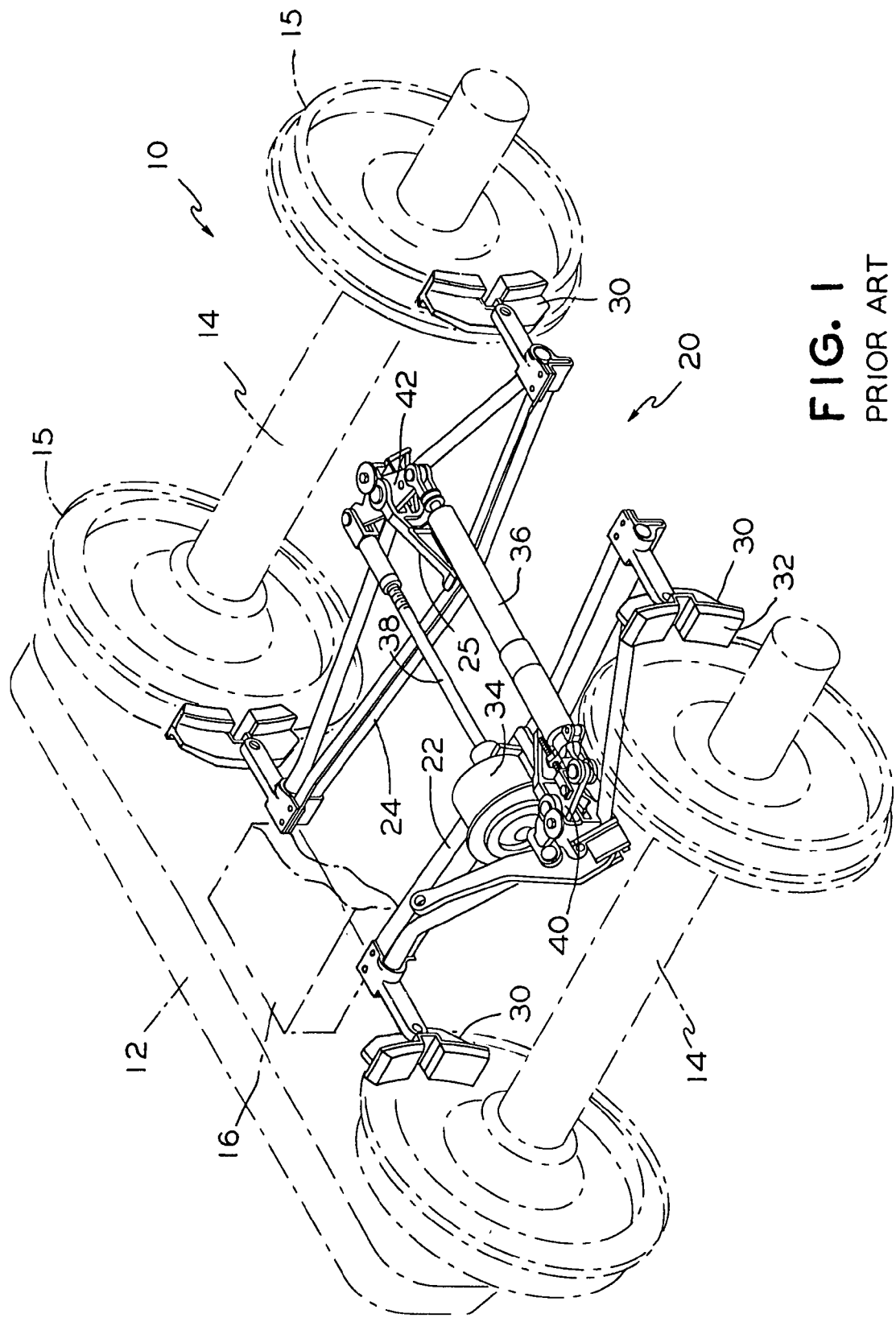
FIG. 1 is a perspective view of a prior art type truck mounted brake assembly.

DETAILED DESCRIPTION OF A PRESENTLY PREFERRED AND VARIOUS ALTERNATIVE EMBODIMENTS OF THE INVENTION

Prior to proceeding with the more detailed description of the invention, a description of a car mounted and truck mounted braking system and their functioning should provide helpful in understanding the present invention. Also, it should be noted that for the sake of clarity, identical components which have identical functions have been identified with identical reference numerals throughout the several views illustrated in the attached drawing figures.

Referring now to FIG. 1 there is shown a truck assembly, generally designated 10, for a railway car 2. Such truck assembly 10 comprises a pair of side frames, one of which is shown as 12, a wheel and axle set 14, at each end of the truck side frames 12 and a partially shown truck bolster member 16 movably attached to such truck side frames 12. Generally, in operation, side frames 12 remain stationary with respect to the wheel and axle set 14, while the bolster member 16 is allowed to move vertically in response to a load carried by the railway car 2. When the load of such railway car increases, the bolster member 16 moves downwardly until the maximum load is reached. As the load decreases, the bolster member 16 moves upwardly and returns to its original vertical position, as the entire load is removed form the railway car 2.

Disposed within the truck assembly 10 is an example of a truck mounted brake assembly, generally designated 20. This particular type of truck mounted brake assembly 20 includes a pair of brake beams 22 and 24 substantially parallel to such bolster member 16, a strut member 25 secured to each of the brake beams 22 and 24 and a brake head 30 attached to each end of each of the brake beams 22 and 24. Each of the brake heads 30 carry a brake shoe 32 thereon and are positioned for engagement with a respective railway car wheel 15 during a brake application.

The truck mounted brake assembly 20 further includes a pneumatic actuator 34 connected to such brake beams 22 and 24 with a pair of force transmitting members 36 and 38, each passing through a respective one of a pair of openings (not shown) in the bolster, with force transmitting member 36 being a well known slack adjuster, and a pair of force transmitting levers 40 and 42. During a braking situation wherein a force is applied by the pneumatic actuator 34, these force transmitting members 36 and 38 and force transmitting levers 40 and 42 transmit and deliver braking forces to the brake beams 22 and 24 and, consequently, to the brake heads 30 and brake shoes 32 mounted thereon.

Figure 2:
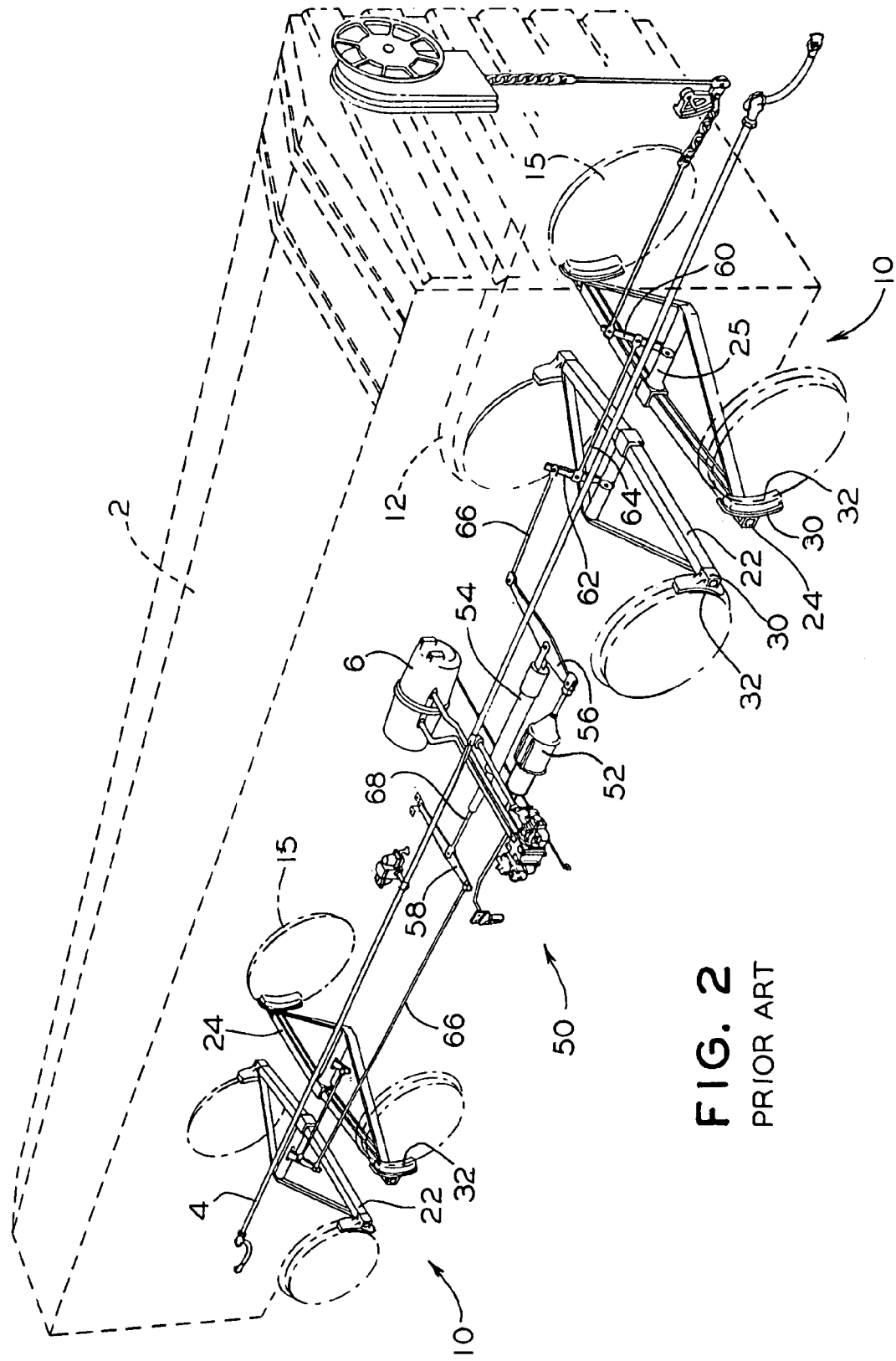
FIG. 2 is a perspective view of a prior art type car mounted brake assembly.

In a particular reference to FIG. 2 there is shown a car mounted brake assembly, generally designated 50, for a railway car 2 having a pair of truck assemblies 10 disposed at each end thereof. The car mounted brake assembly 50 includes a pneumatic actuator 52, a slack adjuster 54 and two pairs of brake beams 22 and 24 mounted at each end of the car mounted brake assembly 50. These brake beams 22 and 24 are actuated by the pneumatic actuator 52 via a series of levers and linkages.

Brake levers are used throughout the braking system to transmit, increase, or decrease braking force, as well as to transfer or change direction of force. There are two basic categories of levers. The first category is body levers such as a cylinder lever 56 and a fulcrumed lever 58. The second category of levers is truck levers, such as live lever 60 and dead lever 62. Truck lever connections, or bottom rods 64, are provided which can extend through the truck 10. This rod 64 is used to transfer the force from the live lever 60 to the dead lever 62. A top rod 66 connects the truck levers 60 and 62 with the body levers 56 and 58 and a center rod 68 connects the two body levers 56 and 58. Thus, during a braking situation, a force is applied by the pneumatic actuator 52 and these levers and rods transmit and deliver braking forces to the brake beams 22 and 24 and, consequently, to the brake heads 30 and brake shoes 32 mounted thereon.

The fluid pressure to the actuators 34 of FIGS. 1 and 52 of FIG. 2 is provided either by the brake hose 4 or by the emergency reservoir 6.

Figure 3:
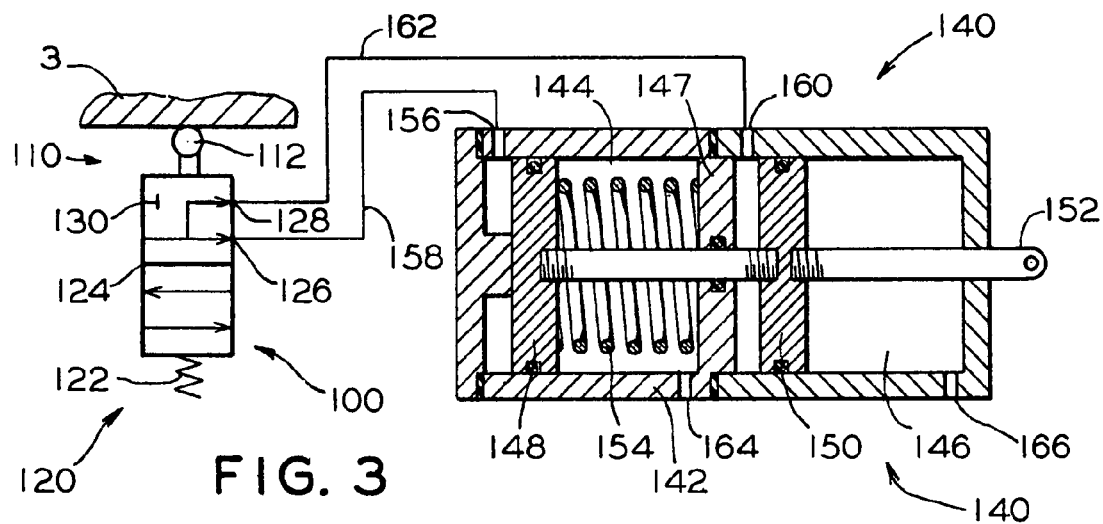
FIG. 3 is a schematic representation for a brake system having a car load compensation arrangement according to one embodiment of the present invention.

In the first embodiment of the present invention, best shown in FIG. 3, there is means, generally designated 100, for sensing a load on the railway car 2 and generating at least one control signal responsive to such load. Preferably, such means 100 is a valve means which includes a linearly movable means 110 cooperating with a predetermined portion 3, vertically movable, of the railway car 2 or the movable bolster member 16 to sense a vertical position thereof and means, generally designated 120, attached directly to the side frame 12 or to an intermediate member (not shown) attached to such side frame 12 and engageable with or connectable to such sensor means 110 to generate at least one control signal responsive to the position of such predetermined portion 3 or the bolster member 16.

It will be appreciated that the mounting of the sensor means 110 and signal generating means 120 may be reversed without affecting operation of the present invention.

Preferably, the sensor means 110 is provided with a member, such as roller 112, attached to one end thereof for minimizing frictional forces during the movement of such predetermined vertically movable portion 3.

In further reference to FIG. 3, the signal generating means 120 is a directional flow control valve operable between a first flow condition and a second flow condition and biased for movement into one of the first and second flow conditions by a bias spring 122. Flow control valve 120 has an inlet port 124 connected to a source of fluid pressure, such as brake pipe 4, and a pair of outlet ports 126 and 128 for generating a fluid pressure signal. In the first flow condition, only the first outlet port 126 is enabled to pass the fluid pressure which enters the valve through the inlet port 124 while the second outlet port 128 is allowed to vent to outside through a vent port 130. In the second flow condition, the fluid pressure exits the flow control valve 120 through both outlet ports 126 and 128 while the vent port 130 is blocked.

In the first embodiment of the present invention, either the brake system 20 of FIG. 1 or the brake system 50 of FIG. 2 is provided with an actuator, generally designated 140, which is a cylinder 140 having a housing 142 with a first chamber 144 and a second chamber 146 sealed therebetween and separated by rigidly held partition 147. A first piston 148, disposed within the first chamber 144, and a second piston 150, disposed within the second chamber 146, are rigidly attached to a common rod 152 for reciprocal movement therewith. One end of the rod 152 is attached to the force transmitting lever 40 of FIG. 1 or the body lever 56 of FIG. 2. A spring means 154 having a predetermined spring rate is engageable with one of the rod 152, first piston 148, second piston 150 and any combination thereof for limiting the brake force being generated by each of the brake shoes 32 and for returning such first piston 148 and second piston 150 into an initial non-actuated position.

The first chamber 144 has an inlet port 156 connectable to the first outlet port 126 of the control valve 120 via the first control line 158 and the second chamber 146 has an inlet port 160 connectable to the second outlet port 128 of the control valve 120 via the second control line 162. Both first and second chambers 144 and 146 respectively are vented to atmosphere through their respective outlet ports 164 and 166.

In operation, when the railway car 2 is empty, the flow control valve 120 will be in the first flow condition and will pass fluid pressure, upon initiation of the braking sequence, through the first output port 126 thus generating a first control fluid pressure signal received at the inlet port 156 of the first chamber 144 through the first control line 158. Subsequently, fluid pressure will be generated at one surface of the first piston 148. The resulting movement of the first and second pistons 148 and 150 respectively will enable actuator 140 to generate a first predetermined braking force responsive to the first flow condition of the flow control valve 120 which will be transferred by the rod 152 to a linkage within the brake system and further to each of the brake shoes 32, wherein the first predetermined braking force will be sufficient to cease movement of the railway car 2 having no load. Advantageously, the predetermined spring rate of the spring means 154 is selected to resist further movement of the first and second pistons 148 and 150, respectively, prevent an additional braking force being generated by each of the brake shoe 32 and return first and second pistons 148 and 150, respectively, to an initial position during a brake release sequence.

As the load of the railway car 2 increases, its structure will move downwardly causing movement of the sensor means 110 enabling the flow control valve 120 to switch into a second flow condition. In such second flow condition, the fluid pressure will be passed through the first outlet port 126 and through the first control line 158 generating a first control fluid signal received at the inlet port 156 of the first chamber 144 of the actuator 140 and, simultaneously, the fluid pressure will be passed through the second outlet port 128 generating a second control fluid pressure signal received at the inlet port 160 of the second chamber 146 of the actuator 140. Subsequently, the actuator 140 will generate the fluid pressure at one surface of each of the first and second pistons 148 and 150 respectively. It will be appreciated that such actuator 140 will generate a second predetermined braking force sufficient to cease movement of the railway car 2 carrying a load. It will be understood that such second predetermined braking force will be greater than the first predetermined braking force responsive to railway car 2 carrying an empty load.

Figure 4:
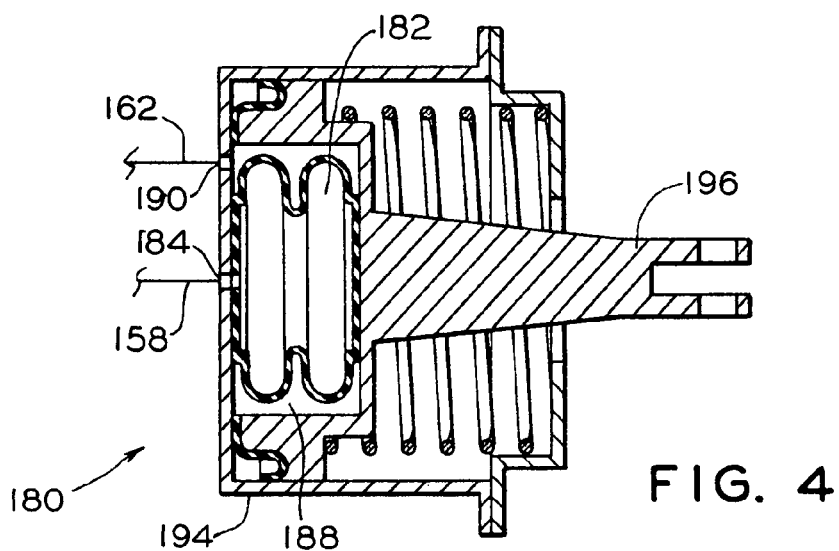
FIG. 4 is a schematic representation for a brake system having a car load compensation arrangement according to another embodiment of the present invention.

In a second embodiment of the present invention, best shown in FIG. 4, either the brake system 20 of FIG. 1 or the brake system 50 of FIG. 2 is provided with an actuator, generally designated 180, comprising a first air spring actuator 182 having an inlet port 184 connectable to first outlet port 126 of the flow control valve 120 via the first control line 158. Such first air spring actuator 182 is disposed within a second air spring actuator 188 which has an inlet port 190 connectable to the second outlet port 128 of the flow control valve 120 via the second control line 162. The first and second air spring actuators 182 and 188 are attached to a rigidly disposed mounting means 194 at one end and to a push rod 196 at a distal end.

In operation, when the railway car 2 is at its empty load weight, the flow control valve 120 will be in the first flow condition and will pass fluid pressure, upon initiation of the braking sequence, through the first output port 126 through the first control line 158 resulting in generation of a first control fluid signal received at the inlet port 184 of the first air spring actuator 182 which causing it to generate a first predetermined braking force sufficient to cease movement of the railway car 2 carrying no load.

The downward movement of the structure of the railway car 2 will cause upward movement of the sensor means 110 enabling the control valve 120 to switch into a second flow condition. In such second flow condition, the fluid pressure will be passed from the first outlet port 126 to the first control line 158 generating a first control fluid signal received at the inlet port 184 of the first air spring actuator 182 and, simultaneously, the fluid pressure will be passed from the second-outlet port 128 generating a second control fluid signal received at the inlet port 190 of second air spring actuator 188 which will generate a second predetermined pressure responsive to the second position of the flow control valve 120 and, more particularly, such actuator 180 will generate a second braking force by each of the brake shoes 32 sufficient cease movement of the railway car 2 carrying a load.

Alternatively, such actuator 180 may be a brake cylinder with a dual piston arrangement as taught in U.S. Pat. No. 6,269,916 to Daugherty, Jr and owned by assignee of the present invention. The teaching of U.S. Pat. No. 6,269,916 is incorporated into this document by reference thereto.

Figure 5:
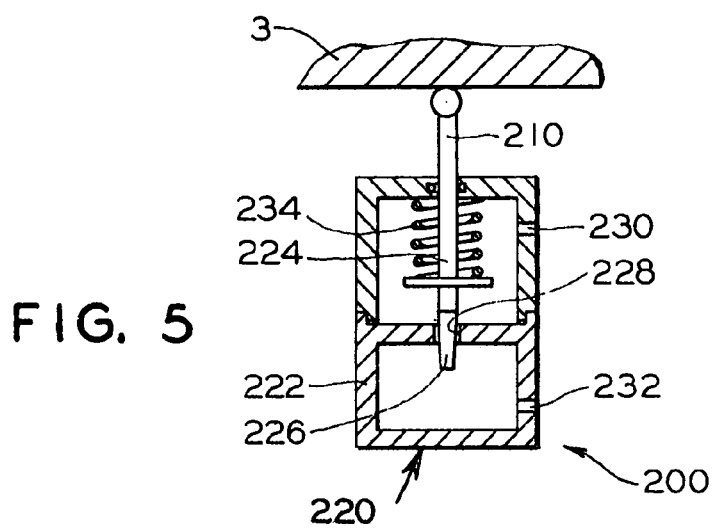
FIG. 5 is a schematic representation for a brake system having a car load compensation arrangement according to yet another embodiment of the present invention.

In a third embodiment of the present invention, best shown in FIG. 5, there is a means, generally designated 200, for sensing a load on the railway car 2, which includes linearly movable sensor means 210 cooperating with a predetermined portion 3, vertically movable, of the railway car 2 to sense the position of such predetermined portion 3 and means, generally designated 220, attached to a rigid structure and engageable with such sensor means 210 to generate at least one control signal proportional to the position of such predetermined portion 3.

In such embodiment, the signal generating means 220 is a metering control valve 220 including a housing 222, a stem 224 mounted for linear reciprocal movement within the housing 222 and connectable to means 210 at one end. The other end of the stem 224 is adapted with a seat means 226 engageable with an orifice 228. There is an inlet port 230 connected to the source of fluid pressure, such as brake pipe 4, and an outlet port 232 having a connection with either the actuator 34 of the brake system 20 of FIG. 1 or the actuator 52 of the brake system 50 of FIG. 2. A spring means 234 is provided to bias the seat means 226 for cooperation with the orifice 228.

The incremental variation in a load carried by the railway car 2 will move the stem 224 and incrementally vary the passage of the fluid pressure received at the inlet port 230 through the orifice 224, thus providing a predetermined fluid pressure at the outlet port 232 which is proportional to the load of the railway car 2.

Advantageously, the use of a metering control valve 220 enables utilization of the currently used pneumatic actuators thus providing for cost advantage in controlling the braking force at the brake shoe.

Those skilled in the art will readily understand that each truck mounted brake assembly 20 of FIG. 1 may be equipped with valve means 100 of FIG. 3 or the valve means 200 of FIG. 5 providing for independent control of the braking forces at each truck assembly 11 which is advantageous in conditions where a load at one end of the railway car 2 is different than the load at the other end of the railway car 2.

Although the present invention has been shown in terms of the car load sensing means directly contacting a vertically movable portion of such railway car structure or the bolster member of the truck assembly, it will be apparent to those skilled in the art, that the present invention may be applied to other non-contact sensing means well known in the art which are either integral to the signal generating means or disposed remotely therefrom and connected thereto. For example, the sensing means may be a well known optical or ultrasonic non contact sensor sensing at least one target and producing an electrical signal which is received by a control valve having an electrically operable actuation means.

Furthermore, the signal generating means may be adapted to generate an electrical signal in applications using an electrically operable device, for example such as an electrically actuated valve or an electrically driven motor, to initiate and generate braking force.

Additionally, although the present invention has been shown in terms of a well known TMX.RTM. or UBX.RTM. type of truck mounted braking system (TMX.RTM. and UBX.RTM are registered trademarks of Westinghouse Airbrake Company, the assignee of the present invention), the present invention may be applied to other types of brake systems, for example, a disk type brake system employed to individually apply brake force to each wheel in response to receiving a supply of fluid pressure.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A load compensating brake system for a railway car, said load compensating brake system comprising:
    (a) a fluid pressure operated control valve including:
        (i) a valve operating means mounted for reciprocal motion and having a first end thereof engageable with one of the railway car, at least one of a pair of truck assemblies and a combination thereof for sensing a vertical position of a vertically movable portion of the at least one of a pair of truck assemblies, a vertically movable portion of the railway car and a combination thereof, said vertical position defining a load carried by the railway car, said valve operating means movable between a first position for sensing the railway car carrying an empty load and a second position for sensing the railway car carrying a load greater than said empty load, and
        (ii) a valve housing attached to a vertically stationary portion of the at least one of the pair of truck assemblies and having an inlet port connected to a source of fluid pressure, a first outlet port and a second outlet port each being in fluid communication with said inlet port, said valve housing is operable between a first fluid flow condition wherein said fluid pressure flows from said inlet port to a first outlet port and a second fluid flow condition wherein said fluid pressure flows from said inlet port to said first outlet port and said second outlet port, said valve housing receiving a second end of said valve operating means and operable thereby to generate a first fluid pressure signal at said first outlet port, said first fluid pressure signal responsive to said valve operating means being in said first position and generates a combination of said first fluid pressure signal at said first outlet port and a second fluid pressure signal at said second outlet port, said combination responsive to said valve operating means being in said second position; and;
    (b) an actuating means engageable with a predetermined portion of said brake system and a predetermined portion of said control means, said actuating means selectively responsive to said first fluid pressure signal to generate a first braking force and to said combination of said first and said second fluid pressure signals to generate a second braking force associated with the load carried by the railway car and apply one of said first and said second braking force to each wheel of the at least one of pair of truck assemblies.

2. A load compensating brake system for a railway car, according to claim 1, wherein said first fluid pressure signal and said second fluid pressure signal are substantially identical.

3. A load compensating brake system for a railway car, according to claim 1, wherein said control valve means includes a bias spring means for biasing said valve body into said first flow condition.

4. A load compensating brake system for a railway car, according to claim 1, wherein said actuating means includes:
    (a) a mounting means attached to a rigid portion of said brake system;
    (b) a push rod connectable to at least one linkage member of said brake system;
    (c) a first air spring actuator disposed intermediate and connected to said mounting means and said push rod, said first air spring actuator having a first fluid communication means connected to said first outlet port of said control valve means for receiving said first fluid pressure signal, whereby said first fluid pressure inflates said first air spring actuator and generates said first predetermined braking force to be transmitted by said push rod; and
    (d) a second air spring actuator disposed intermediate and connected to said mounting means and said push rod, said second air spring actuator having a second fluid communication means connected to said second outlet port of said control valve means for receiving said second fluid pressure signal, said second air spring actuator axially receives said first air spring actuator, whereby said combination of said first fluid pressure signal and said second fluid pressure signal substantially simultaneously inflates said first air spring actuator and said second air spring actuator and generates said second predetermined braking force to be transmitted by said push rod.

5. A load compensating brake system for a railway car, according to claim 1, wherein said actuating means is a cylinder including:
    (a) a housing engageable with said railway car brake system and having a first closed end and an opposed second closed end;
    (b) a partition rigidly and sealably disposed within said housing intermediate said first closed end and said opposed second closed end;
    (c) a cylinder rod disposed for reciprocal movement within said housing and extending through said partition and second closed end, said cylinder rod connectable to at least one linkage member of said brake system at an end extending through said second closed end of said housing;
    (d) a first fluid chamber formed intermediate said first closed end and said partition;
    (e) a second fluid chamber formed intermediate said partition and said second closed end;
    (f) a first piston sealably disposed within said first fluid chamber and attached to said cylinder rod for movement therewith;
    (g) a second piston sealably disposed within said second fluid chamber and attached to said cylinder rod for movement therewith;
    (h) a first fluid communication means in fluid communication with said first fluid chamber and with said first outlet port of said control valve means for receiving said first fluid pressure signal and supplying it to said first fluid chamber, whereby said first fluid pressure signal moves said first piston and said cylinder rod and generates said first predetermined braking force which is transmitted by said cylinder rod; and (i) a second fluid communication means in fluid communication with said second fluid chamber and with said second outlet port of control said valve means for receiving said second fluid pressure signal and for supplying it to said second fluid chamber, whereby said combination of said first fluid pressure signal and said second fluid pressure signal substantially simultaneously moves said first piston, said second piston and said cylinder rod and generates said second predetermined braking force which is transmitted by said cylinder rod.

6. A load compensating brake system for a railway car, according to claim 5, wherein said cylinder further includes a spring means having a predetermined spring rate and engageable with one of said cylinder rod, said first piston, said second piston and any combination thereof for controlling one of said first predetermined braking force, said second predetermined braking force and a combination thereof and for returning said first piston and said second piston to an initial non-actuated position during a brake release.

7. A load compensating brake system for a railway car, according to claim 1, wherein said actuating means is a cylinder including:

(a) a casing engageable with said railway car brake system;
(b) a hollow piston assembly mounted for reciprocal movement within said casing, said hollow piston assembly having a hollow portion defined by a back wall and at least one sidewall;
(c) a small piston assembly positioned within said hollow portion, said small piston assembly including a first surface facing said back wall and a peripheral edge portion for sealingly engaging an inner surface of said at least one sidewall;
(d) a first space defined by said back wall of said hollow portion, at least a portion of said inner surface of said at least one sidewall and said first surface of said small piston assembly;
(e) a piston rod assembly having a first end and a second end, said first end being connected with said hollow piston assembly and said second end being engageable with to at least one linkage member of said brake system such that movement of said piston rod assembly in an outward direction during a brake application initiates a braking sequence of said brake system;
(f) a first fluid communication means in fluid communication with said first space and said first outlet port of said control valve means for supplying said first fluid pressure signal within said first space during said brake application of the railway vehicle braking system resulting in movement of said hollow piston assembly away from said small piston assembly and generation of said first predetermined braking force and for evacuating fluid pressure from said first space during a brake release of the railway vehicle braking system resulting in movement of said hollow piston assembly toward said small piston assembly;
(g) a second fluid communication means in fluid communication with said second space and said second outlet port of said control valve means for supplying said second fluid pressure signal to said second space during said brake application of the brake system resulting in a further movement of said hollow piston assembly away from said small piston assembly and generation of said second predetermined braking force and for evacuating fluid pressure from said second space during said brake release of said brake system; and (h) means for venting said second space to atmosphere during application of said fluid pressure within said first space.

8. A load compensating brake system for a railway car, according to claim 1, wherein said at least one control signal is at least one fluid pressure signal and wherein said control means is a metering control valve having:

(a) a housing attached to the vertically stationary portion of the at least one of the pair of truck assemblies and having an inlet port connected to a source of fluid pressure, an outlet port, and an internal partition means being interposed said inlet port and said outlet port;
(b) an orifice having a predetermined size and disposed within said internal partition means, whereby a flow of said fluid pressure from said inlet port to said outlet port passes through said orifice;
(c) a valve actuating means mounted for reciprocal motion within said housing and having a first end engageable with one of the vertically movable railway car structure and the vertically movable portion of the at least one of the pair of truck assemblies, said valve actuating means movable between a first position associated with the railway car carrying an empty load and a second position associated with the railway car carrying a full load;
(d) a seat means attached to a second end of valve actuating means and at least partially engageable with said orifice for changing said predetermined size thereof, whereby incremental movement of said valve actuating means between said first and said second position causes an incremental movement of said seat means and incremental change of said predetermined size of said orifice resulting in metering said fluid pressure received at said inlet port from said fluid pressure source and in generation of a predetermined fluid pressure signal at said outlet port which is proportional to the load carried by the railway car.

9. A load compensating brake system for a railway car, according to claim 8, wherein said actuating means includes a fluid communication means connected to said outlet port for receiving said predetermined fluid pressure signal during said brake application resulting in generation of a predetermined braking force.

10. A load compensating brake system for a railway car truck assembly, said brake assembly comprising:

(a) first and second brake beams interposed between a bolster member and a respective one of a wheel and axle set so as to be in substantially parallel relationship with the bolster member, said first and second brake beams having brake shoes carried thereon adjacent each wheel tread of the wheel and axle set for engagement therewith when said brake beams are spread apart;
(b) first and second transfer levers pivotally-connected, respectively, at a point intermediate each end thereof to said first and second brake beams, each said transfer lever forming first and second lever arms, an effective length of said first and second lever arms of at least one of said first and second transfer levers being dissimilar;
(c) first force-transmitting means passing through a first opening of the bolster member for connection with said first lever arms of said first and second transfer levers;
(e) second force-transmitting means passing through a second opening of the bolster member for connection with said second lever arms of said first and second transfer levers to effect rotation of said second transfer lever, whereby a force is exerted on said first and second brake beams, at said pivotal connection of said first and second transfer levers therewith, in opposite directions;

(f) a fluid pressure operated control valve means which is connected to a source of a fluid pressure at an inlet port thereof and which is attached to one of the railway car, at least one of a pair side frames and a combination thereof for sensing a vertical position of one of the bolster member, a vertically movable portion of a railway car structure and a combination thereof, said vertical position corresponding to a load carried by the railway car, said fluid pressure operated control valve means further generating a first fluid pressure control signal at a first outlet port when said vertical position defining an empty load carried by the railway car and generating a combination of said first fluid pressure control signal at said first outlet port and a second fluid pressure control signal at a second outlet port when said vertical position defining a load greater than said empty load carried by the railway car, said first and said second outlet ports being in fluid communication with said inlet port; and (g) an actuating means disposed within said first force-transmitting means for effecting rotation of said first transfer lever, said actuating means engageable with a predetermined portion of said control means and selectively responsive to said first control signal to generate a first braking force and to combination of said first and said second control signals to generate a second braking force.

11. In a railway car mounted brake assembly having a brake actuator, a slack adjuster and a pair of brake beams mounted on each truck assembly of said railway car, said brake beams being actuated by said brake actuator via a series of levers and linkages, each of said brake beams having a brake head at each end thereof, each of said brake heads carrying a brake shoe thereon positioned for engagement with a respective one a respective railway vehicle wheel during a brake application, the improvement comprising:

(a) a fluid pressure operated control valve means which is connected to a source of a fluid pressure at an inlet port thereof and which is attached to one of said railway car, at least one of said truck assemblies and a combination thereof for sensing a vertical position of one of such vertically movable portion of at least one of said truck assemblies, a vertically movable portion of said railway car structure and a combination thereof, said vertical position defining a load carried by said railway car, said control means further generating a first fluid pressure control signal at a first outlet port when said vertical position defining an empty load carried by said railway car and generating a combination of said first fluid pressure control signal at said first outlet port and a second fluid pressure control signal at a second outlet port when said vertical position defining a load greater than said empty load carried by said railway car, said first and said second outlet ports being in fluid communication with said inlet port; and (b) said brake actuator responsive to said first fluid pressure control signal to generate a first braking force associated with said empty load and to said combination of said first and said second fluid pressure control signals to generate a second braking force associated with said load greater than said empty load carried by said railway car and respectively apply one of said first braking force and said second braking force to each wheel of at least one of said truck assemblies.

* * * * *